(12) United States Patent
Nishibe et al.

(10) Patent No.: US 11,285,438 B2
(45) Date of Patent: Mar. 29, 2022

(54) CARBON DIOXIDE SEPARATION RECOVERY SYSTEM AND METHOD

(71) Applicant: KAWASAKI JUKOGYO KABUSHIKI KAISHA, Kobe (JP)

(72) Inventors: Shohei Nishibe, Kobe (JP); Kazuo Tanaka, Kobe (JP); Katsuhiro Yoshizawa, Akashi (JP); Takeshi Okumura, Kobe (JP); Ryohei Numaguchi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/267,905

(22) PCT Filed: Oct. 29, 2019

(86) PCT No.: PCT/JP2019/042336
§ 371 (c)(1),
(2) Date: Feb. 11, 2021

(87) PCT Pub. No.: WO2020/090807
PCT Pub. Date: May 7, 2020

(65) Prior Publication Data
US 2021/0187438 A1 Jun. 24, 2021

(30) Foreign Application Priority Data
Oct. 30, 2018 (JP) .............................. JP2018-204321

(51) Int. Cl.
*B01D 53/26* (2006.01)
*B01D 53/34* (2006.01)
(Continued)

(52) U.S. Cl.
CPC ........... *B01D 53/62* (2013.01); *B01D 53/265* (2013.01); *B01D 53/343* (2013.01); *B01D 53/83* (2013.01);
(Continued)

(58) Field of Classification Search
CPC .... B01D 53/1475; B01D 53/62; B01D 53/81; B01D 53/82; B01D 2257/504;
(Continued)

(56) References Cited

U.S. PATENT DOCUMENTS

2010/0028233 A1* 2/2010 Dreuscher ............ B01D 53/508
423/244.08
2014/0331864 A1 11/2014 Ogino et al.

FOREIGN PATENT DOCUMENTS

JP 2013-121562 A 6/2013

* cited by examiner

*Primary Examiner* — Timothy C Vanoy
(74) *Attorney, Agent, or Firm* — Oliff PLC

(57) ABSTRACT

A carbon dioxide separation recovery method includes: bringing a particulate carbon dioxide adsorbent and a treatment target gas containing carbon dioxide into contact with each other to make the carbon dioxide adsorbent adsorb the carbon dioxide contained in the treatment target gas; and bringing the carbon dioxide adsorbent which has adsorbed the carbon dioxide and desorption steam into contact with each other to desorb the carbon dioxide from the carbon dioxide adsorbent, and thereby, regenerate the carbon dioxide adsorbent and recover the desorbed carbon dioxide. The step of recovering the carbon dioxide includes utilizing a recovery gas as a heat source of a heat exchanger, the recovery gas containing the desorption steam which has contacted the carbon dioxide adsorbent and the carbon dioxide which has been desorbed from the carbon dioxide adsorbent.

13 Claims, 4 Drawing Sheets

(51) Int. Cl.
*B01D 53/62* (2006.01)
*B01D 53/83* (2006.01)
*B01D 53/96* (2006.01)
*C01B 32/50* (2017.01)

(52) U.S. Cl.
CPC .............. *B01D 53/96* (2013.01); *C01B 32/50* (2017.08); *B01D 2253/102* (2013.01); *B01D 2253/104* (2013.01); *B01D 2253/20* (2013.01); *B01D 2253/25* (2013.01); *B01D 2257/504* (2013.01); *B01D 2258/0283* (2013.01); *C01B 2210/0003* (2013.01)

(58) Field of Classification Search
CPC . B01D 2258/0283; Y02C 20/40; Y02E 20/32; F28D 2021/0019
See application file for complete search history.

CARBON DIOXIDE SEPARATION RECOVERY SYSTEM AND METHOD

TECHNICAL FIELD

The present invention relates to a carbon dioxide separation recovery technique of separating and recovering carbon dioxide contained in a treatment target gas by using a carbon dioxide adsorbent.

BACKGROUND ART

A carbon dioxide separation recovery system which separates and recovers carbon dioxide contained in a treatment target gas by using a carbon dioxide adsorbent has been known. For example, PTL 1 discloses this type of carbon dioxide separation recovery system.

The carbon dioxide separation recovery system of PTL 1 is a moving-bed system in which the carbon dioxide adsorbent is continuously transferred through an adsorbing tower, a regeneration tower, a drying tower, and a cooling tower in this order. In the adsorbing tower, the adsorbent and the treatment target gas containing carbon dioxide are brought into contact with each other, and with this, the carbon dioxide contained in the treatment target gas is adsorbed by the adsorbent. In the regeneration tower, the adsorbent which has adsorbed the carbon dioxide and saturated steam are brought into contact with each other, and with this, the carbon dioxide is desorbed from the adsorbent. The desorbed carbon dioxide is compressed by a compression pump and is then stored in a carbon dioxide holder. In the drying tower, the adsorbent to which condensed water of the saturated steam has adhered in the regeneration tower is dried by heating. In the cooling tower, the dried adsorbent is cooled to a temperature suitable for the adsorption of the carbon dioxide. The cooled adsorbent returns to the adsorbing tower by a conveyor.

CITATION LIST

Patent Literature

PTL 1: Japanese Laid-Open Patent Application Publication No. 2013-121562

SUMMARY OF INVENTION

Technical Problem

In a system which brings the carbon dioxide adsorbent and the steam into direct contact with each other in order to regenerate the carbon dioxide adsorbent as in PTL 1, a gas (hereinafter referred to as a "recovery gas") discharged from a desorption reactor (regeneration tower) contains the steam in addition to the carbon dioxide which has been desorbed from the carbon dioxide adsorbent. It is desirable that in order to suppress a load change of the compression pump, moisture be removed from the recovery gas before the recovery gas is compressed by the compression pump.

Typically, when selectively removing steam from a gas containing the steam, the steam is condensed and removed as water. Such condensation of the steam generates heat. Therefore, by recovering latent heat of the steam from the recovery gas, energy can be further effectively utilized.

The present invention was made under these circumstances, and an object of the present invention is to promote further effective utilization of energy in a carbon dioxide separation recovery technique.

Solution to Problem

A carbon dioxide separation recovery system according to one aspect of the present invention includes: an adsorption reactor into which a particulate carbon dioxide adsorbent flows; a treatment target gas supply line configured to supply a treatment target gas containing carbon dioxide to the adsorption reactor; a treated gas discharge line configured to discharge from the adsorption reactor the treatment target gas from which the carbon dioxide has been adsorbed and removed by contact with the carbon dioxide adsorbent; a desorption reactor into which the carbon dioxide adsorbent which has adsorbed the carbon dioxide in the adsorption reactor flows; a desorption steam supply line configured to supply desorption steam to the desorption reactor; a carbon dioxide recovery line configured to discharge a recovery gas from the desorption reactor, the recovery gas containing the desorption steam which has contacted the carbon dioxide adsorbent and the carbon dioxide which has been desorbed from the carbon dioxide adsorbent; and a transfer apparatus configured to transfer to the adsorption reactor the carbon dioxide adsorbent from which the carbon dioxide has been desorbed in the desorption reactor. The carbon dioxide recovery line includes a heat exchanger configured to utilize the recovery gas as a heat source.

In the above, the heat exchanger may include the desorption reactor and a passage which is formed at the desorption reactor and through which the recovery gas flows, and the heat exchanger may perform heat exchange between the carbon dioxide adsorbent and the recovery gas.

Or, in the above, the heat exchanger may perform heat exchange between a treated gas flowing through the treated gas discharge line and the recovery gas.

Or, in the above, the carbon dioxide separation recovery system may further include: a dryer into which the carbon dioxide adsorbent from which the carbon dioxide has been desorbed in the desorption reactor flows; a drying gas supply line configured to supply a drying gas to the dryer; and a drying gas discharge line configured to discharge from the dryer the drying gas which has passed through the dryer. The heat exchanger may be at least one of a first heat exchanger configured to perform heat exchange between the drying gas flowing through the drying gas supply line and the recovery gas and a second heat exchanger configured to perform heat exchange between the drying gas flowing through the drying gas discharge line and the recovery gas.

According to the above carbon dioxide separation recovery system, the heat energy (including energy of latent heat of the desorption steam) of the recovery gas is recovered and utilized in the heat exchanger, and part or all of moisture is removed from the recovery gas. As above, since the carbon dioxide separation recovery system utilizes the heat energy of the recovery gas, further effective utilization of energy in the system is promoted.

A carbon dioxide separation recovery system according to another aspect of the present invention includes: a treatment reactor filled with a particulate carbon dioxide adsorbent; a treatment target gas supply line configured to supply a treatment target gas containing carbon dioxide to the treatment reactor; a treated gas discharge line configured to discharge from the treatment reactor the treatment target gas from which the carbon dioxide has been adsorbed and removed by contact with the carbon dioxide adsorbent; a desorption steam supply line configured to supply desorption steam to the treatment reactor; a carbon dioxide recovery line configured to discharge a recovery gas from the treatment reactor, the recovery gas containing the desorption steam which has contacted the carbon dioxide adsorbent and the carbon dioxide which has been desorbed from the carbon dioxide adsorbent; and a switching apparatus configured to switch between a state where the treatment target gas supply line and the treated gas discharge line are connected to the treatment reactor and a state where the desorption steam supply line and the carbon dioxide recovery line are connected to the treatment reactor. The carbon dioxide recovery line includes a heat exchanger configured to utilize the recovery gas as a heat source.

In the above, the heat exchanger may include the treatment reactor and a passage which is formed at the treatment reactor and through which the recovery gas flows, and the heat exchanger may perform heat exchange between the carbon dioxide adsorbent and the recovery gas.

Or, in the above, the heat exchanger may perform heat exchange between a treated gas discharged from the treatment reactor and flowing through the treated gas discharge line and the recovery gas.

Or, in the above, the carbon dioxide separation recovery system may further include a drying gas supply line configured to supply a drying gas to the treatment reactor. The heat exchanger may perform heat exchange between the drying gas flowing through the drying gas supply line and the recovery gas.

According to the above carbon dioxide separation recovery system, the heat energy (including energy of latent heat of the desorption steam) of the recovery gas is recovered and utilized in the heat exchanger, and part or all of moisture is removed from the recovery gas. As above, since the carbon dioxide separation recovery system utilizes the heat energy of the recovery gas, further effective utilization of energy in the system is promoted.

In the above, the carbon dioxide recovery line may include: a condenser provided downstream of the heat exchanger in a flow direction of the recovery gas and configured to condense moisture contained in the recovery gas; and a compression pump provided downstream of the condenser in the flow direction of the recovery gas and configured to compress the recovery gas.

Since the amount of condensed water adhering to the surface of the carbon dioxide adsorbent is suppressed, the amount of steam contained in the recovery gas increases. However, since the heat exchanger and the condenser which are provided at the carbon dioxide recovery line remove the moisture of the recovery gas, a load change of the compression pump can be suppressed.

Moreover, a carbon dioxide separation recovery method according to yet another aspect of the present invention includes: bringing a particulate carbon dioxide adsorbent and a treatment target gas containing carbon dioxide into contact with each other to make the carbon dioxide adsorbent adsorb the carbon dioxide contained in the treatment target gas; and bringing the carbon dioxide adsorbent which has adsorbed the carbon dioxide and desorption steam into contact with each other to desorb the carbon dioxide from the carbon dioxide adsorbent, and thereby, regenerate the carbon dioxide adsorbent and recover the desorbed carbon dioxide. The step of recovering the carbon dioxide includes utilizing a recovery gas as a heat source of a heat exchanger, the recovery gas containing the desorption steam which has contacted the carbon dioxide adsorbent and the carbon dioxide which has been desorbed from the carbon dioxide adsorbent.

In the above, the heat exchanger may perform heat exchange between the carbon dioxide adsorbent and the recovery gas.

Or, in the above, the heat exchanger may perform heat exchange between the treatment target gas which has contacted the carbon dioxide adsorbent and the recovery gas.

According to the above carbon dioxide separation recovery method, the heat energy (including energy of latent heat of the desorption steam) of the recovery gas is recovered and utilized in the heat exchanger, and part or all of moisture is removed from the recovery gas. As above, since the carbon dioxide separation recovery system utilizes the heat energy of the recovery gas, further effective utilization of energy in the system is promoted.

Advantageous Effects of Invention

The present invention can promote further effective utilization of energy in a carbon dioxide separation recovery technique.

DESCRIPTION OF EMBODIMENTS

A carbon dioxide separation recovery system according to the present invention performs: a treatment in which a particulate carbon dioxide adsorbent (hereinafter simply referred to as an "adsorbent") and a treatment target gas containing carbon dioxide are brought into contact with each other, and with this, the carbon dioxide is adsorbed by the adsorbent; and a treatment in which the adsorbent which has adsorbed the carbon dioxide and desorption steam are brought into contact with each other, and with this, the carbon dioxide is desorbed (removed) from the adsorbent, and as a result, the adsorbent is regenerated. The carbon dioxide which has been desorbed from the adsorbent is recovered.

A treatment target gas is, for example, a flue gas. The adsorbent is, for example, a porous substance impregnated with amine. Examples of the porous substance include activated carbon and activated alumina. Hereinafter, Embodiments 1 and 2 of the present invention will be described with reference to the drawings.

Embodiment 1

Figure 1:
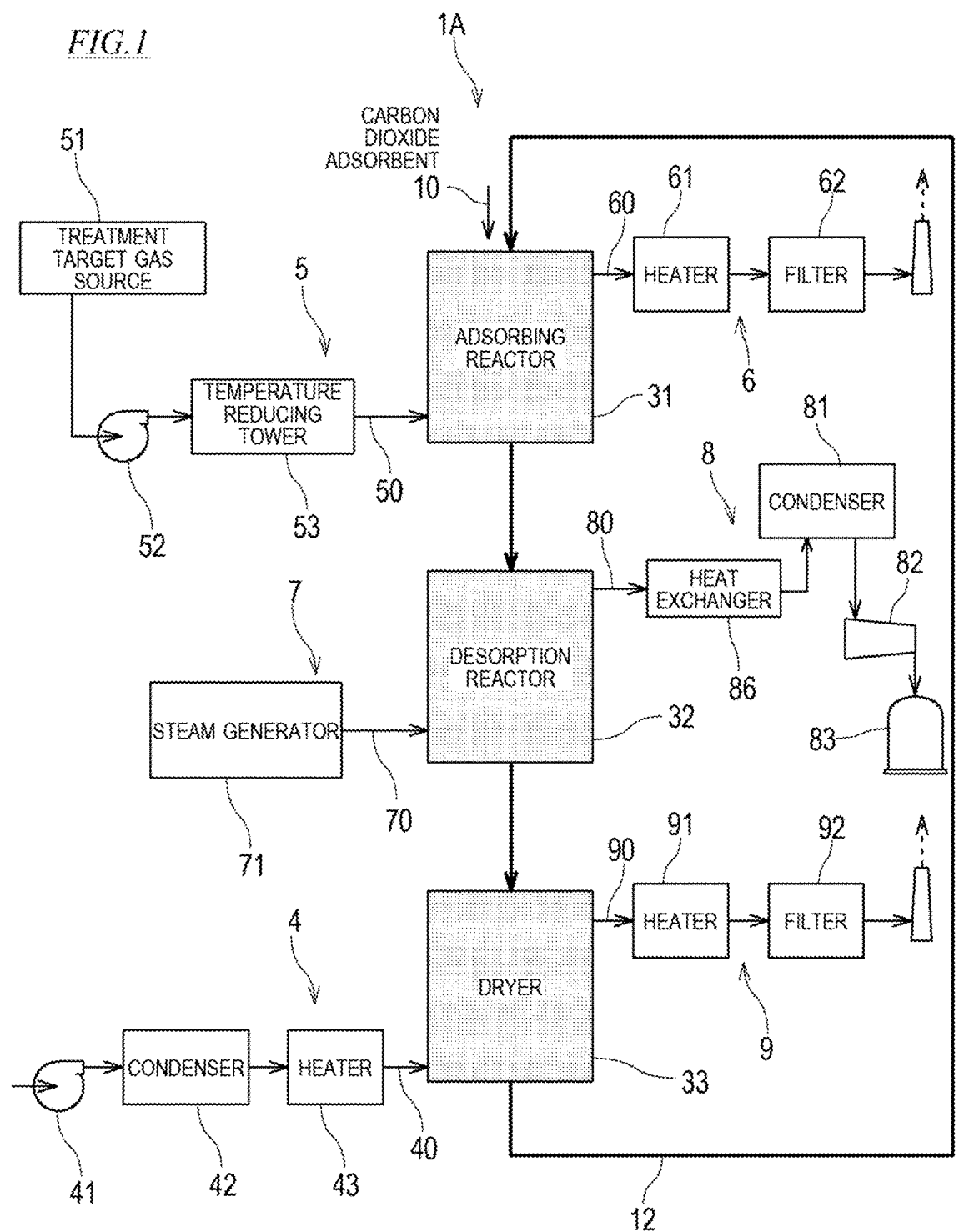
FIG. 1 is a block diagram showing an entire configuration of a carbon dioxide separation recovery system according to Embodiment 1 of the present invention.

FIG. 1 is a block diagram showing an entire configuration of a carbon dioxide separation recovery system 1A according to Embodiment 1 of the present invention. The carbon dioxide separation recovery system 1A shown in FIG. 1 is a system including a plurality of moving-bed treatment reactors (an adsorption reactor 31, a desorption reactor 32, and a dryer 33).

The carbon dioxide separation recovery system 1A includes the adsorption reactor 31, the desorption reactor 32, the dryer 33, a treatment target gas supply line 5, a treated gas discharge line 6, a desorption steam supply line 7, a carbon dioxide recovery line 8, a drying gas supply line 4, a drying gas discharge line 9, and a transfer apparatus 12.

An adsorbent 10 conveyed by the transfer apparatus 12 is supplied to the adsorption reactor 31 through an upper inlet at a predetermined supply rate. A hopper (not shown) configured to temporarily store the adsorbent 10 may be provided above the adsorption reactor 31, and the adsorbent 10 may be supplied to the adsorption reactor 31 through the hopper. In the adsorption reactor 31, the adsorbent 10 is supplied through the upper inlet and discharged through a lower outlet, and therefore, the adsorbent 10 moves from an upper side to a lower side at a predetermined rate.

The treatment target gas supply line 5 is connected to a lower portion of the adsorption reactor 31. The treatment target gas supply line 5 includes a channel 50, a blower 52, and a temperature reducing tower 53. The treatment target gas supplied from a treatment target gas source 51 to the adsorption reactor 31 flows through the channel 50. The blower 52 and the temperature reducing tower 53 are provided at the channel 50. The treatment target gas containing carbon dioxide is supplied from the treatment target gas source 51 to the adsorption reactor 31 by the blower 52. In the temperature reducing tower 53, the treatment target gas is cooled to a temperature suitable for a carbon dioxide adsorption reaction.

A countercurrent moving bed where the treatment target gas flowing upward and the adsorbent 10 moving downward continuously contact each other is formed at the adsorption reactor 31. When the treatment target gas and the adsorbent 10 are brought into contact with each other, the adsorbent 10 selectively adsorbs the carbon dioxide contained in the treatment target gas. At this time, the temperature of the adsorbent 10 is, for example, 40° C.

The treated gas discharge line 6 is connected to an upper portion of the adsorption reactor 31. The treated gas discharge line 6 includes a channel 60, a heater 61, and a filter 62. A treated gas discharged from the adsorption reactor 31 flows through the channel 60. The heater 61 and the filter 62 are provided at the channel 60. The treatment target gas (i.e., the treated gas) from which the carbon dioxide has been adsorbed and removed by contact with the adsorbent 10 flows out to the treated gas discharge line 6 and is warmed by the heater 61 to suppress white smoke. Then, powder dust is removed from the treatment target gas by the filter 62, and the treatment target gas is discharged to an atmosphere.

The desorption reactor 32 is arranged under the adsorption reactor 31. The lower outlet of the adsorption reactor 31 and an upper inlet of the desorption reactor 32 are connected to each other through a pressure switching device (not shown), such as a lock hopper. The adsorbent 10 discharged from the adsorption reactor 31 flows into the desorption reactor 32 through the upper inlet by its own weight. In the desorption reactor 32, the adsorbent 10 which has adsorbed the carbon dioxide moves from an upper side to a lower side at a predetermined rate.

The desorption steam supply line 7 is connected to a lower portion of the desorption reactor 32. The desorption steam supply line 7 includes a steam generator 71 and a channel 70 through which desorption steam is supplied from the steam generator 71 to the desorption reactor 32. The desorption steam generated by the steam generator 71 is supplied to the lower portion of the desorption reactor 32. A countercurrent moving bed where the desorption steam flowing upward and the adsorbent 10 moving downward continuously contact each other is formed in the desorption reactor 32.

In the desorption reactor 32, carbon dioxide partial pressure (carbon dioxide concentration) of the desorption steam which contacts the adsorbent 10 is significantly lower than carbon dioxide partial pressure (carbon dioxide concentration) of the surface of the adsorbent 10. By using the difference between these carbon dioxide partial pressures as a driving force, the carbon dioxide which has been adsorbed by the adsorbent 10 diffuses into the desorption steam. As above, by using the difference between the carbon dioxide partial pressure of the desorption steam and the carbon dioxide partial pressure of the surface of the adsorbent 10 as the driving force, the carbon dioxide is desorbed from the adsorbent 10, and thus, the adsorbent 10 is regenerated.

The carbon dioxide recovery line 8 is connected to an upper portion of the desorption reactor 32. The carbon dioxide recovery line 8 includes a carbon dioxide holder 83, a channel 80, a heat exchanger 86, a condenser 81, and a compression pump 82. A recovery gas supplied from the desorption reactor 32 to the carbon dioxide holder 83 flows through the channel 80. The heat exchanger 86, the condenser 81, and the compression pump 82 are provided at the channel 80. The recovery gas is a gas containing the desorption steam and the carbon dioxide which has been desorbed from the adsorbent 10. The recovery gas flows out from the desorption reactor 32 to the carbon dioxide recovery line 8 by forced air discharge of the compression pump 82. Moisture contained in the recovery gas is condensed and removed by the condenser 81. The recovery gas from which the moisture has been removed is compressed by the compression pump 82, and with this, the recovery gas becomes high-concentration carbon dioxide and is then recovered by the carbon dioxide holder 83.

It should be noted that the pressure in the desorption reactor 32 is kept at predetermined pressure by the forced air discharge of the compression pump 82. To be specific, the pressure of the desorption steam which contacts the adsorbent 10 is adjusted to predetermined pressure by the operation of the compression pump 82.

The dryer 33 is arranged under the desorption reactor 32. A lower outlet of the desorption reactor 32 and an upper inlet of the dryer 33 are connected to each other through a pressure switching apparatus (not shown), such as a lock hopper. The adsorbent 10 discharged from the desorption reactor 32 flows into the dryer 33 through the upper inlet by its own weight. In the dryer 33, the regenerated adsorbent 10 moves from an upper side to a lower side at a predetermined rate.

The drying gas supply line 4 is connected to a lower portion of the dryer 33. The drying gas supply line 4 includes a channel 40, a condenser 42, and a heater 43. A drying gas supplied from a blower 41 to the dryer 33 flows through the channel 40. The condenser 42 and the heater 43 are provided at the channel 40. The drying gas supplied by pressure from the blower 41 is dried by the condenser 42, is warmed by the heater 43 to a temperature suitable for the drying, and is supplied to the dryer 33.

A countercurrent moving bed where the drying gas flowing upward and the adsorbent 10 moving downward continuously contact each other is formed in the dryer 33. When the drying gas and the adsorbent 10 contact each other, the moisture adhering to the surface of the adsorbent 10 evaporates, and the adsorbent 10 is dried.

The drying gas discharge line 9 is connected to an upper portion of the adsorption reactor 31. The drying gas discharge line 9 includes a channel 90, a heater 91, and a filter 92. The drying gas discharged from the dryer 33 flows through the channel 90. The heater 91 and the filter 92 are provided at the channel 90. The drying gas which has contacted the adsorbent 10 flows out to the drying gas discharge line 9 and is warmed by the heater 91 to suppress white smoke. Then, powder dust is removed from the drying gas by the filter 92, and the drying gas is discharged to an atmosphere.

The adsorbent 10 discharged from a lower outlet of the dryer 33 is returned to the inlet of the adsorption reactor 31 by the transfer apparatus 12. The transfer apparatus 12 may be, for example, a conveyor. While the adsorbent 10 is being transferred by the transfer apparatus 12, the temperature of the adsorbent 10 decreases due to heat release to about 40° C. that is an adsorption temperature of the carbon dioxide in the adsorption reactor 31. It should be noted that when the temperature of the adsorbent 10 does not decrease to the adsorption temperature while the adsorbent 10 is being transferred by the transfer apparatus 12, a cooling tank (not shown) may be provided at a portion of the transfer apparatus 12.

As above, the carbon dioxide separation recovery system 1A includes: the adsorption reactor 31 into which the particulate adsorbent 10 flows; the treatment target gas supply line 5 configured to supply the treatment target gas containing carbon dioxide to the adsorption reactor 31; the treated gas discharge line 6 configured to discharge from the adsorption reactor 31 the treatment target gas from which the carbon dioxide has been adsorbed and removed by contact with the adsorbent 10; the desorption reactor 32 into which the adsorbent 10 which has adsorbed the carbon dioxide in the adsorption reactor 31 flows; the desorption steam supply line 7 configured to supply the desorption steam to the desorption reactor 32; the carbon dioxide recovery line 8 configured to discharge from the desorption reactor 32 the desorption steam containing the carbon dioxide, which has been desorbed from the adsorbent 10, by contact with the adsorbent 10; and the transfer apparatus 12 configured to transfer to the adsorption reactor 31 the adsorbent 10 from which the carbon dioxide has been desorbed in the desorption reactor 32.

A carbon dioxide separation recovery method executed by the carbon dioxide separation recovery system 1A configured as above includes: bringing the particulate adsorbent 10 and the treatment target gas containing carbon dioxide into contact with each other to make the adsorbent 10 adsorb the carbon dioxide contained in the treatment target gas; and bringing the adsorbent 10 which has adsorbed the carbon dioxide and the desorption steam into contact with each other to desorb the carbon dioxide from the adsorbent 10 and thereby regenerate the adsorbent 10 and recover the desorbed carbon dioxide.

It should be noted that between the desorption reactor 32 and the transfer apparatus 12, the carbon dioxide separation recovery system 1A further includes: the dryer 33 into which the adsorbent 10 from which the carbon dioxide has been desorbed in the desorption reactor 32 flows; the drying gas supply line 4 configured to supply the drying gas to the dryer 33; and the drying gas discharge line 9 configured to discharge from the dryer 33 the drying gas which has passed through the dryer 33. However, as described below, the dryer 33, the drying gas supply line 4, and the drying gas discharge line 9 may be omitted.

In the present embodiment, the desorption steam is superheated steam. More specifically, the desorption steam is superheated steam having pressure not more than saturated steam pressure at a temperature of the adsorbent 10 which contacts the desorption steam and also having a temperature higher than the temperature of the adsorbent 10 which contacts the desorption steam. Therefore, the pressure of the desorption steam in the desorption reactor 32 is kept at pressure not more than the saturated steam pressure at the temperature of the adsorbent 10 which contacts the desorption steam. Moreover, the desorption steam supplied through the desorption steam supply line 7 to the desorption reactor 32 has a temperature higher than the temperature of the adsorbent 10 which contacts the desorption steam. However, the desorption steam is not limited to this, and saturated steam or normal-pressure superheated steam may be used.

It should be noted that "the temperature of the adsorbent 10 which contacts the desorption steam" may be an average temperature of the adsorbent 10 in the desorption reactor 32, a temperature of the adsorbent 10 at the upper inlet of the desorption reactor 32, or a temperature of the adsorbent 10 at a vertically intermediate position in the desorption reactor 32. A lower limit of the saturation temperature of the desorption steam is not especially limited. In consideration of drying efficiency of the adsorbent 10, the lower limit of the saturation temperature of the desorption steam may be set to a temperature that is lower by about 15° C. than the temperature of the adsorbent 10 which contacts the desorption steam.

It should be noted that in the carbon dioxide separation recovery system 1A, the moisture supplied through the desorption steam supply line 7 to the desorption reactor 32 does not condense on the surface of the adsorbent 10, and most of the moisture flows out to the carbon dioxide recovery line 8. Therefore, the recovery gas flowing into the carbon dioxide recovery line 8 contains a large amount of steam. Therefore, the heat exchanger 86 configured to utilize the recovery gas as a high-heat source and the condenser 81 configured to condense the moisture contained in the recovery gas are provided at the carbon dioxide recovery line 8.

The condenser 81 removes the moisture contained in the recovery gas and decreases the temperature of the recovery gas to a temperature (for example, about 10° C.) suitable for the compression of the compression pump 82. As above, part or all of the steam contained in the recovery gas is removed. As a result, the carbon dioxide concentration of the recovery gas recovered by the carbon dioxide holder 83 can be increased. Moreover, since the recovery gas in which the amount of moisture has been reduced and which has been cooled flows into the compression pump 82, a load change of the compression pump 82 can be suppressed, and the compression pump 82 can operate stably.

There is an adequate difference between the temperature of the recovery gas discharged from the desorption reactor 32 and the temperature of the recovery gas flowing into the compression pump 82, and the recovery gas contains a large amount of steam. Therefore, the recovery gas discharged from the desorption reactor 32 passes through the heat exchanger 86 before flowing into the condenser 81, and with this, exhaust heat (for example, about 60 to 70° C.) of the desorption reactor 32 is effectively utilized. The heat exchanger 86 utilizes the recovery gas as the high-heat source and makes a cold medium recover heat energy of the recovery gas. Since part or all of the steam contained in the recovery gas is changed into water by the heat exchanger 86, the above heat energy of the recovery gas includes energy of latent heat of the steam. It should be noted that the heat exchanger 86 can also remove the moisture from the recovery gas.

Figure 2:
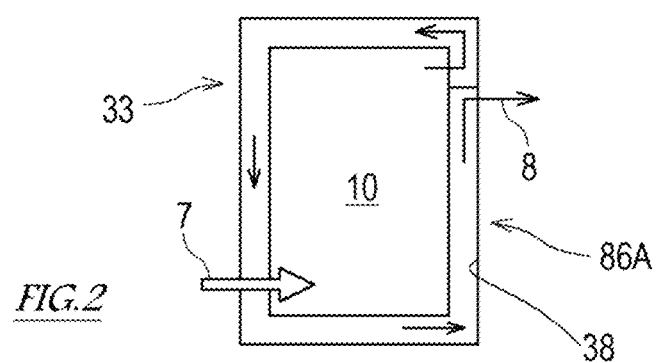
FIG. 2 is a diagram showing a first example of a heat exchanger.

FIG. 2 is a diagram showing a first example of the heat exchanger 86. As shown in FIG. 2, the heat exchanger 86 may be constituted as a heat exchanger 86A configured to keep the desorption reactor 32 warm. The heat exchanger 86A according to the first example includes the desorption reactor 32 and a passage 38 which is formed at the desorption reactor 32 and through which the recovery gas flows. The passage 38 may be a jacket passage which covers an outer periphery of the desorption reactor 32. The heat exchanger 86A keeps the desorption reactor 32 warm by heat exchange between the desorption reactor 32 (and the adsorbent 10 in the desorption reactor 32) and the recovery gas.

Figure 3:
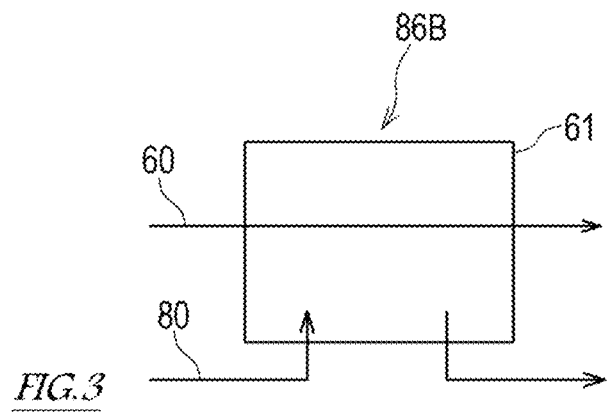
FIG. 3 is a diagram showing a second example of the heat exchanger.

FIG. 3 is a diagram showing a second example of the heat exchanger 86. As shown in FIG. 3, the heat exchanger 86 may be constituted as a heater 61 (heat exchanger 86B) provided at the treated gas discharge line 6. The heater 61 includes: a shell through which the recovery gas of the carbon dioxide recovery line 8 flows; and a tube through which the treated gas of the treated gas discharge line 6 flows. The heater 61 warms up the treated gas by heat exchange between the treated gas flowing through the treated gas discharge line 6 and the recovery gas.

It should be noted that in FIG. 3, the heater 61 provided at the treated gas discharge line 6 is shown as one example of the heat exchanger 86B. As with the heater 61, each of the heater 43 and the heater 91 may be constituted as the heat exchanger 86B. To be specific, the heat exchanger 86 may be the heater 43 constituted as a heat exchanger configured to perform heat exchange between the drying gas flowing through the drying gas supply line 4 and the recovery gas. Or, the heat exchanger 86 may be the heater 91 constituted as a heat exchanger configured to perform heat exchange between the drying gas flowing through the drying gas discharge line 9 and the recovery gas.

Figure 4:
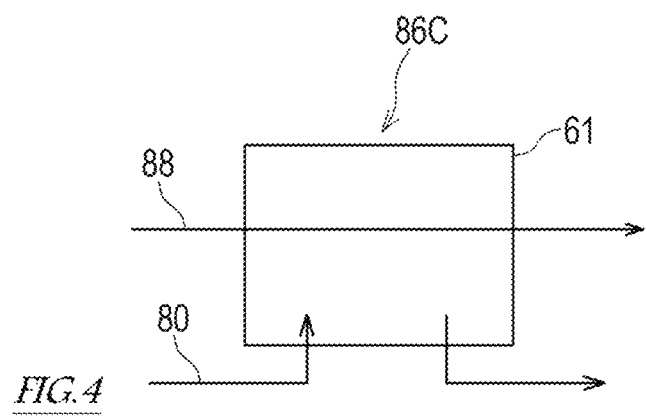
FIG. 4 is a diagram showing a third example of the heat exchanger.

FIG. 4 is a diagram showing a third example of the heat exchanger 86. As shown in FIG. 4, the heat exchanger 86 may be a heat exchanger 86C configured to perform heat exchange between a cold medium 88 and the recovery gas. For example, the heat exchanger 86C includes: a shell through which the recovery gas of the carbon dioxide recovery line 8 flows; and a tube through which the cold medium 88 flows. In the heat exchanger 86C, the cold medium 88 recovers the heat energy of the recovery gas. The heat energy recovered by the cold medium 88 may be utilized for, for example, keeping the desorption reactor 32 warm or warming up fluids in the heaters 43, 61, and 91 or may be utilized in the other devices.

The carbon dioxide separation recovery system 1A includes at least one of the heat exchangers 86A, 86B, and 86C according to the first, second, and third examples. As above, since the carbon dioxide separation recovery system 1A recovers and utilizes the heat energy (including the energy of the latent heat of the steam) of the recovery gas, further effective utilization of energy in the system is promoted.

Embodiment 2

Figure 5:
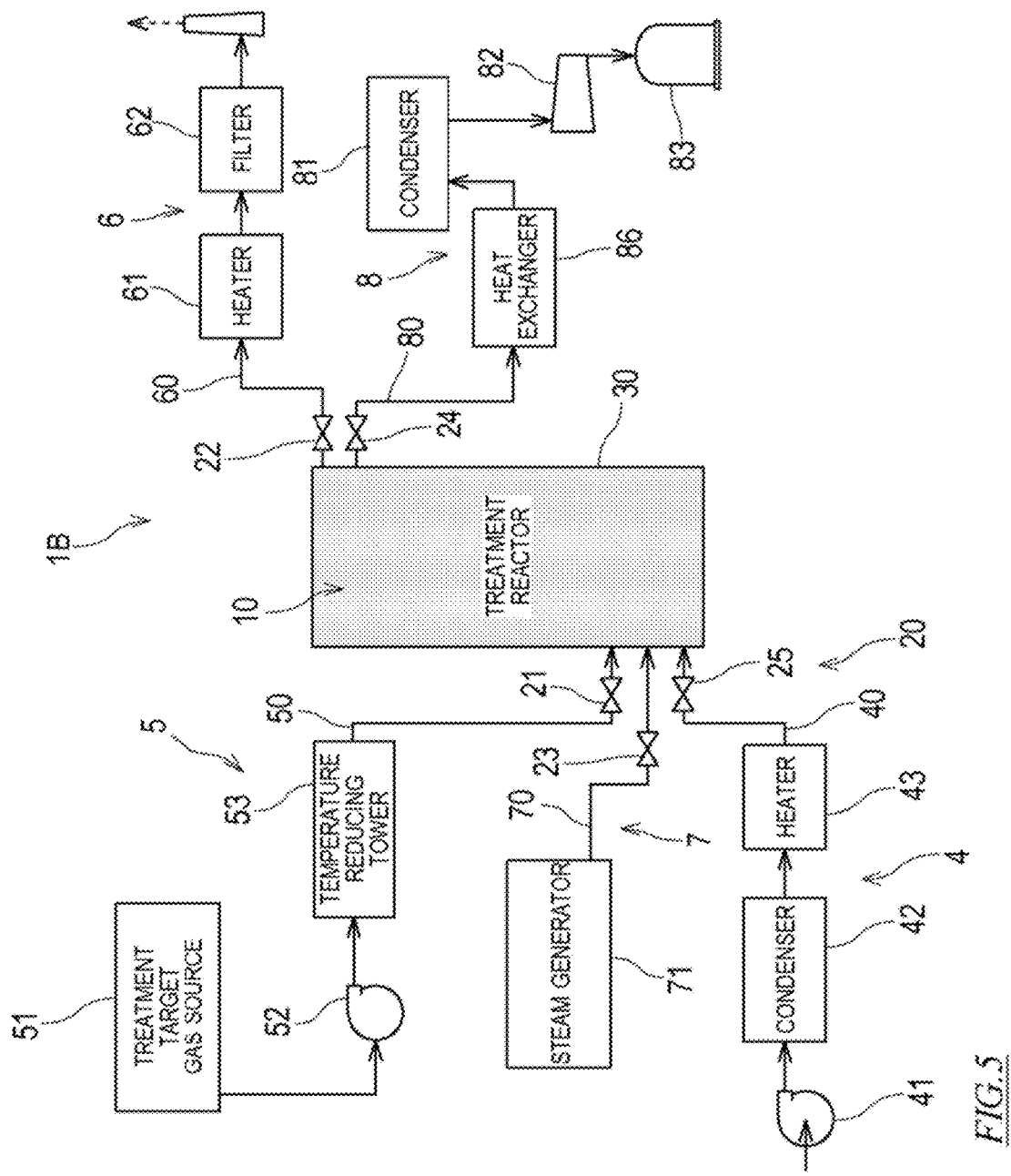
FIG. 5 is a block diagram showing an entire configuration of the carbon dioxide separation recovery system according to Embodiment 2 of the present invention.

Next, Embodiment 2 of the present invention will be described. FIG. 5 is a block diagram showing an entire configuration of a carbon dioxide separation recovery system 1B according to Embodiment 2 of the present invention. In the description of Embodiment 2, the same reference signs are used for the same or corresponding components as in Embodiment 1, and a repetition of the same explanation is avoided.

The carbon dioxide separation recovery system 1B shown in FIG. 5 is a system including a fixed-bed treatment reactor 30. According to the carbon dioxide separation recovery system 1B, in the single treatment reactor 30, a treatment in which the adsorbent 10 adsorbs carbon dioxide, a treatment in which the adsorbent 10 is regenerated by desorbing the carbon dioxide from the adsorbent 10, and a treatment in which the adsorbent 10 is dried are performed.

The carbon dioxide separation recovery system 1B includes: the treatment reactor 30 filled with the particulate the adsorbent 10; the treatment target gas supply line 5 configured to supply the treatment target gas containing carbon dioxide to the treatment reactor 30; the treated gas discharge line 6 configured to discharge from the adsorption reactor 31 the treatment target gas from which the carbon dioxide has been adsorbed and removed by contact with the adsorbent 10; the desorption steam supply line 7 configured to supply the desorption steam to the treatment reactor 30; and the carbon dioxide recovery line 8 configured to discharge the recovery gas from the treatment reactor 30, the recovery gas containing the desorption steam which has contacted the adsorbent 10 and the carbon dioxide which has been desorbed from the adsorbent 10. The carbon dioxide separation recovery system 1B further includes the drying gas supply line 4 configured to supply the drying gas to the treatment reactor 30, but the drying gas supply line 4 is omitted.

The treatment target gas supply line 5, the desorption steam supply line 7, and the drying gas supply line 4 are selectively connected to a lower portion of the treatment reactor 30. Moreover, the treated gas discharge line 6 and the carbon dioxide recovery line 8 are selectively connected to an upper portion of the treatment reactor 30.

The heat exchanger 86 provided at the carbon dioxide recovery line 8 may be, for example, a heat exchanger (see the heat exchanger 86A in FIG. 2) including the treatment reactor 30 and a passage which is formed at the treatment reactor 30 and through which the recovery gas flows, the heat exchanger being configured to perform heat exchange between the treatment reactor 30 (and the adsorbent 10 in the treatment reactor 30) and the recovery gas.

The heat exchanger 86 may be, for example, a heat exchanger (see the heat exchanger 86B in FIG. 3) configured to perform heat exchange between the treated gas discharged from the treatment reactor 30 and flowing through the treated gas discharge line 6 and the recovery gas, i.e., the heat exchanger 86 may be the heater 61.

The heat exchanger 86 may be, for example, a heat exchanger configured to perform heat exchange between the drying gas flowing through the drying gas supply line 4 and the recovery gas, i.e., the heat exchanger 86 may be the heater 43.

The heat exchanger 86 may be, for example, a heat exchanger (see the heat exchanger 86C in FIG. 4) configured to perform heat exchange between the cold medium and the recovery gas.

The carbon dioxide separation recovery system 1B further includes a switching apparatus 20 configured to switch among a state where the treatment target gas supply line 5 and the treated gas discharge line 6 are connected to the treatment reactor 30, a state where the desorption steam supply line 7 and the carbon dioxide recovery line 8 are connected to the treatment reactor 30, and a state where the drying gas supply line 4 and the treated gas discharge line 6 are connected to the treatment reactor 30.

The switching apparatus 20 according to the present embodiment includes switching valves 21, 22, 23, 24, and 25 and a switching controller (not shown). The switching valves 21, 22, 23, 24, and 25 are provided at respective connection portions between the treatment reactor 30 and the respective lines that are the treatment target gas supply line 5, the treated gas discharge line 6, the desorption steam supply line 7, the carbon dioxide recovery line 8, and the drying gas supply line 4. The switching controller opens or closes the switching valves 21, 22, 23, 24, and 25. It should be noted that the configuration of the switching apparatus 20 is not limited to the present embodiment. For example, manual switching valves may be provided instead of the switching valves 21, 22, 23, 24, and 25.

The carbon dioxide separation recovery system 1B configured as above performs a treatment in which when the treatment target gas supply line 5 and the treated gas discharge line 6 are connected to the treatment reactor 30, the adsorbent 10 and the treatment target gas are brought into contact with each other in the treatment reactor 30, and with this, the adsorbent 10 adsorbs the carbon dioxide contained in the treatment target gas. The treated gas from which the carbon dioxide has been removed is discharged through the treated gas discharge line 6 to an outside of the system.

Then, the switching apparatus 20 switches to the state where the desorption steam supply line 7 and the carbon dioxide recovery line 8 are connected to the treatment reactor 30, and the carbon dioxide separation recovery system 1B performs a treatment in which the adsorbent 10 which has adsorbed the carbon dioxide and the desorption steam are brought into contact with each other, and with this, the carbon dioxide is desorbed from the adsorbent 10, and as a result, the adsorbent 10 is regenerated. The recovery gas containing the carbon dioxide which has been desorbed from the adsorbent is discharged from the treatment reactor 30 to the carbon dioxide recovery line 8. The heat energy of the recovery gas is utilized in the heat exchanger 86, and the moisture contained in the recovery gas is condensed and removed by the condenser 81. Then, the recovery gas is compressed by the compression pump 82 to become high-concentration carbon dioxide and is recovered by the carbon dioxide holder 83.

Moreover, the switching apparatus 20 switches to the state where the drying gas supply line 4 and the treated gas discharge line 6 are connected to the treatment reactor 30, and the carbon dioxide separation recovery system 1B performs a treatment in which the regenerated adsorbent 10 and the drying gas are brought into contact with each other, and with this, the adsorbent 10 is dried. The drying gas which has passed through the treatment reactor 30 is discharged through the treated gas discharge line 6 to an outside of the system.

In the carbon dioxide separation recovery system 1B according to Embodiment 2, as with the carbon dioxide separation recovery system 1A according to Embodiment 1, the desorption steam is superheated steam having pressure not more than the saturated steam pressure at the temperature of the adsorbent 10 which contacts the desorption steam and also having a temperature higher than the temperature of the adsorbent 10 which contacts the desorption steam. Therefore, the pressure in the treatment reactor 30 at the time of the reproduction treatment is kept by the forced air discharge of the compression pump 82 with respect to the treatment reactor 30 at pressure that is not more than the saturated steam pressure at the temperature of the adsorbent 10 which contacts the desorption steam. It should be noted that "the temperature of the adsorbent 10 which contacts the desorption steam" may be an average temperature of the adsorbent 10 in the treatment reactor 30, a temperature of the adsorbent 10 at an upper inlet of the treatment reactor 30, or a temperature of the adsorbent 10 at a vertically intermediate position of the treatment reactor 30. However, the desorption steam is not limited to this, and saturated steam or normal-pressure superheated steam may be used.

In the carbon dioxide separation recovery system 1B, the moisture supplied through the desorption steam supply line 7 to the desorption reactor 32 does not condense on the surface of the adsorbent 10, and most of the steam flows out to the carbon dioxide recovery line 8. Therefore, the recovery gas flowing into the carbon dioxide recovery line 8 contains a large amount of steam. The heat energy of the recovery gas including the energy of the latent heat of the steam is recovered and utilized by the heat exchanger 86. As above, in the carbon dioxide separation recovery system 1B, further effective utilization of energy in the system is promoted.

The foregoing has described preferred embodiments of the present invention. Modifications of specific structures and/or functional details of the above embodiments may be included in the present invention as long as they are within the scope of the present invention.

For example, in the carbon dioxide separation recovery systems 1A and 1B according to Embodiments 1 and 2, the superheated steam is utilized as the desorption steam. However, the desorption steam is not limited to this, and saturated steam or normal-pressure superheated steam may be used.

REFERENCE SIGNS LIST 1A, 1B carbon dioxide separation recovery system
4 drying gas supply line
5 treatment target gas supply line
6 treated gas discharge line
7 desorption steam supply line
8 carbon dioxide recovery line
9 drying gas discharge line
10 adsorbent
12 transfer apparatus
20 switching apparatus
21, 22, 23, 24, 25 switching valve
30 treatment reactor
31 adsorption reactor
32 desorption reactor
33 dryer
38 passage
40 channel
41 blower
42 condenser
43 heater
50 channel
51 treatment target gas source
52 blower
53 temperature reducing tower
60 channel
61 heater
62 filter
70 channel
71 steam generator
80 channel
81 condenser
82 compression pump
83 carbon dioxide holder
86, 86A to 86C heat exchanger
90 channel
91 heater
92 filter

The invention claimed is:

1. A carbon dioxide separation recovery system comprising:
    an adsorption reactor into which a particulate carbon dioxide adsorbent flows;
    a treatment target gas supply line configured to supply a treatment target gas containing carbon dioxide to the adsorption reactor;
    a treated gas discharge line configured to discharge from the adsorption reactor the treatment target gas from which the carbon dioxide has been adsorbed and removed by contact with the carbon dioxide adsorbent;
    a desorption reactor into which the carbon dioxide adsorbent which has adsorbed the carbon dioxide in the adsorption reactor flows;
    a desorption steam supply line configured to supply desorption steam to the desorption reactor;
    a carbon dioxide recovery line configured to discharge a recovery gas from the desorption reactor, the recovery gas containing the desorption steam which has contacted the carbon dioxide adsorbent and the carbon dioxide which has been desorbed from the carbon dioxide adsorbent; and
    a transfer apparatus configured to transfer to the adsorption reactor the carbon dioxide adsorbent from which the carbon dioxide has been desorbed in the desorption reactor, wherein
    the carbon dioxide recovery line includes a heat exchanger configured to utilize the recovery gas as a heat source.

2. The carbon dioxide separation recovery system according to claim 1, wherein:
    the heat exchanger includes the desorption reactor and a passage which is formed at the desorption reactor and through which the recovery gas flows; and
    the heat exchanger performs heat exchange between the desorption reactor and the recovery gas.

3. The carbon dioxide separation recovery system according to claim 1, wherein the heat exchanger performs heat exchange between a treated gas flowing through the treated gas discharge line and the recovery gas.

4. The carbon dioxide separation recovery system according to claim 1, further comprising:
    a dryer into which the carbon dioxide adsorbent from which the carbon dioxide has been desorbed in the desorption reactor flows;
    a drying gas supply line configured to supply a drying gas to the dryer; and
    a drying gas discharge line configured to discharge from the dryer the drying gas which has passed through the dryer, wherein:
    the heat exchanger is at least one of a first heat exchanger configured to perform heat exchange between the drying gas flowing through the drying gas supply line and the recovery gas and a second heat exchanger configured to perform heat exchange between the drying gas flowing through the drying gas discharge line and the recovery gas.

5. A carbon dioxide separation recovery system comprising:
    a treatment reactor filled with a particulate carbon dioxide adsorbent;
    a treatment target gas supply line configured to supply a treatment target gas containing carbon dioxide to the treatment reactor;
    a treated gas discharge line configured to discharge from the treatment reactor the treatment target gas from which the carbon dioxide has been adsorbed and removed by contact with the carbon dioxide adsorbent;
    a desorption steam supply line configured to supply desorption steam to the treatment reactor;
    a carbon dioxide recovery line configured to discharge a recovery gas from the treatment reactor, the recovery gas containing the desorption steam which has contacted the carbon dioxide adsorbent and the carbon dioxide which has been desorbed from the carbon dioxide adsorbent; and
    a switching apparatus configured to switch between a state where the treatment target gas supply line and the treated gas discharge line are connected to the treatment reactor and a state where the desorption steam supply line and the carbon dioxide recovery line are connected to the treatment reactor, wherein
    the carbon dioxide recovery line includes a heat exchanger configured to utilize the recovery gas as a heat source.

6. The carbon dioxide separation recovery system according to claim 5, wherein:
    the heat exchanger includes the treatment reactor and a passage which is formed at the treatment reactor and through which the recovery gas flows; and
    the heat exchanger performs heat exchange between the treatment reactor and the recovery gas.

7. The carbon dioxide separation recovery system according to claim 5, wherein the heat exchanger performs heat exchange between a treated gas discharged from the treatment reactor and flowing through the treated gas discharge line and the recovery gas.

8. The carbon dioxide separation recovery system according to claim 5, further comprising a drying gas supply line configured to supply a drying gas to the treatment reactor, wherein
    the heat exchanger performs heat exchange between the drying gas flowing through the drying gas supply line and the recovery gas.

9. The carbon dioxide separation recovery system according to claim 1, wherein the carbon dioxide recovery line includes:
    a condenser provided downstream of the heat exchanger in a flow direction of the recovery gas and configured to condense moisture contained in the recovery gas; and
    a compression pump provided downstream of the condenser in the flow direction of the recovery gas and configured to compress the recovery gas.

10. A carbon dioxide separation recovery method comprising:
    bringing a particulate carbon dioxide adsorbent and a treatment target gas containing carbon dioxide into contact with each other to make the carbon dioxide adsorbent adsorb the carbon dioxide contained in the treatment target gas; and
    bringing the carbon dioxide adsorbent which has adsorbed the carbon dioxide and desorption steam into contact with each other to desorb the carbon dioxide from the carbon dioxide adsorbent, and thereby, regenerate the carbon dioxide adsorbent and recover the desorbed carbon dioxide, wherein
    the step of recovering the carbon dioxide includes utilizing a recovery gas as a heat source of a heat exchanger, the recovery gas containing the desorption steam which has contacted the carbon dioxide adsorbent and the carbon dioxide which has been desorbed from the carbon dioxide adsorbent.

11. The carbon dioxide separation recovery method according to claim 10, wherein the heat exchanger performs heat exchange between the carbon dioxide adsorbent and the recovery gas.

12. The carbon dioxide separation recovery method according to claim 10, wherein the heat exchanger performs heat exchange between the treatment target gas which has contacted the carbon dioxide adsorbent and the recovery gas.

13. The carbon dioxide separation recovery system according to claim 5, wherein the carbon dioxide recovery line includes:
- a condenser provided downstream of the heat exchanger in a flow direction of the recovery gas and configured to condense moisture contained in the recovery gas; and
- a compression pump provided downstream of the condenser in the flow direction of the recovery gas and configured to compress the recovery gas.

\* \* \* \* \*